United States Patent
Schackow et al.

(10) Patent No.: US 8,006,281 B2
(45) Date of Patent: Aug. 23, 2011

(54) NETWORK ACCESSIBLE TRUSTED CODE

(75) Inventors: Stefan N. Schackow, Bellevue, WA (US); Nikhil Kothari, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1279 days.

(21) Appl. No.: 11/614,943

(22) Filed: Dec. 21, 2006

(65) Prior Publication Data

US 2008/0155642 A1      Jun. 26, 2008

(51) Int. Cl.
G06F 17/00 (2006.01)
H04K 1/00 (2006.01)

(52) U.S. Cl. .......... 726/1; 726/30; 726/2; 717/174; 717/172; 713/189; 713/190; 711/118

(58) Field of Classification Search .............. None
See application file for complete search history.

(56) References Cited

U.S. PATENT DOCUMENTS

| | | | |
|---|---|---|---|
| 4,919,545 A | 4/1990 | Yu | |
| 6,108,703 A | 8/2000 | Leighton et al. | |
| 6,185,733 B1 | 2/2001 | Breslau | |
| 6,405,219 B2 | 6/2002 | Saether et al. | |
| 6,499,137 B1 | 12/2002 | Hunt | |
| 6,754,699 B2 | 6/2004 | Swildens et al. | |
| 6,868,439 B2 | 3/2005 | Basu et al. | |
| 6,996,616 B1 | 2/2006 | Leighton et al. | |
| 7,127,713 B2 * | 10/2006 | Davis et al. | 717/177 |
| 7,155,741 B2 * | 12/2006 | Sobel et al. | 726/22 |
| 7,272,613 B2 * | 9/2007 | Sim et al. | 1/1 |
| 7,594,003 B2 * | 9/2009 | Davidson et al. | 709/219 |
| 2002/0133491 A1 | 9/2002 | Sim et al. | |
| 2003/0101200 A1 | 5/2003 | Koyama et al. | |
| 2005/0251686 A1 * | 11/2005 | Torrubia-Saez | 713/182 |
| 2005/0283537 A1 | 12/2005 | Li et al. | |
| 2006/0155779 A1 | 7/2006 | Kim et al. | |
| 2006/0165014 A1 | 7/2006 | Ikeda | |
| 2006/0184931 A1 * | 8/2006 | Rochette et al. | 717/169 |
| 2007/0079075 A1 * | 4/2007 | Collier et al. | 711/141 |

FOREIGN PATENT DOCUMENTS

WO  WO0188761  11/2001

OTHER PUBLICATIONS

Comparing Java and .NET Security: Lessons Learned and Missed; Nathanael Paul, David Evans, 19 pages.
Deploying Assemblies; Basic Instincts; Ted Pattison, 25 pages.
Towards a Versioning Model for Component-based Software Assembly; Jaroslav Gergic; 10 pages.

* cited by examiner

*Primary Examiner* — Nasser Moazzami
*Assistant Examiner* — Fikremariam Yalew
(74) *Attorney, Agent, or Firm* — Workman Nydegger

(57) ABSTRACT

In one embodiment, a computer system performs a method for accessing a trusted assembly from a virtualized location. A computer system detects receipt of a request to access an assembly. The address of the assembly is expressed in the request as a virtualized location. The computer system resolves the virtualized location to a physical location where the assembly is physically stored. The resolving includes accessing an information store that maintains the current physical location corresponding to the requested assembly's virtualized location. The computer system determines whether the requested assembly qualifies as a trusted assembly by verifying that the assembly sufficiently complies with information encoded within the assembly. Lastly, upon determining that the requested assembly is trusted, the computer system accesses the requested assembly from the physical location.

20 Claims, 3 Drawing Sheets

NETWORK ACCESSIBLE TRUSTED CODE

BACKGROUND

Computers are used all over the world to perform a wide variety of tasks. Computers perform these tasks by processing software code which contains commands that are interpreted and executed by the computer. Software code is typically written by a developer using one or more scripting or programming languages. Because most software programs are quite complex and involve the interaction of multiple functions, variables and processes, application programming interfaces and shared libraries have been developed to allow a developer to incorporate common functionality into the program without having to write the code for it. This also helps to cut down on the size of a software program which, in turn, increases program processing efficiency. Thus, shared libraries are commonly used in many of today's software applications.

Many times, in a computer system with a variety of installed applications, a shared library or assemblies cache (i.e. a store of compiled, executable code) will be secured to allow the various programs read and execute access, but deny them write access (typically only a system administrator will have write access to the assemblies cache). This prevents programs from overwriting assemblies in the cache. In such cases, the assemblies cache is said to be trusted. Thus, virtually any software program installed on the computer system can read and execute assemblies from the assemblies as cache without having to verify the integrity or authenticity of each assembly. The assemblies themselves are inherently trusted because the assemblies are located in the trusted assemblies cache. Avoiding authenticity checks in this manner also increases program processing efficiency.

To take advantage of shared assemblies, developers typically include metadata in the software program that points to the trusted assemblies cache. At runtime, an assembly from the cache can be read and/or executed by any function or routine in the program as part of normal program processing. An assembly can be called multiple times during the processing of a software program. In some cases, multiple functions may read and execute (or attempt to execute) an assembly at the same time. Some operating systems have a means for creating instances of assemblies and providing each program its own instance of the assembly. For example, using instances of assemblies, multiple programs may simultaneously access an assembly that writes characters and/or images to a display screen.

Thus, because trusted assemblies caches are convenient and lead to more efficient software program processing, they have become mainstream in modern software development. Assemblies caches, however, are limited as to the locations in which they can be deployed. Currently, the trusted assemblies cache location is predefined in the software program and cannot be modified without changes to the program code of the software program. Furthermore, the trusted assemblies cache is located on the same computer system as the software applications that are accessing the assemblies in the cache.

BRIEF SUMMARY

Embodiments of the present invention are directed to accessing a trusted assembly from a virtualized location. In one embodiment, a computer system performs a method for accessing a trusted assembly from a virtualized location. A computer system detects receipt of a request to access an assembly. The address of the assembly is expressed in the request as a virtualized location. The computer system resolves the virtualized location to a physical location where the assembly is physically stored. The resolving includes accessing an information store that maintains the current physical location corresponding to the requested assembly's virtualized location. The computer system determines whether the requested assembly qualifies as a trusted assembly by verifying that the assembly sufficiently complies with information encoded within the assembly. Lastly, upon determining that the requested assembly is trusted, the computer system accesses the requested assembly from the physical location.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
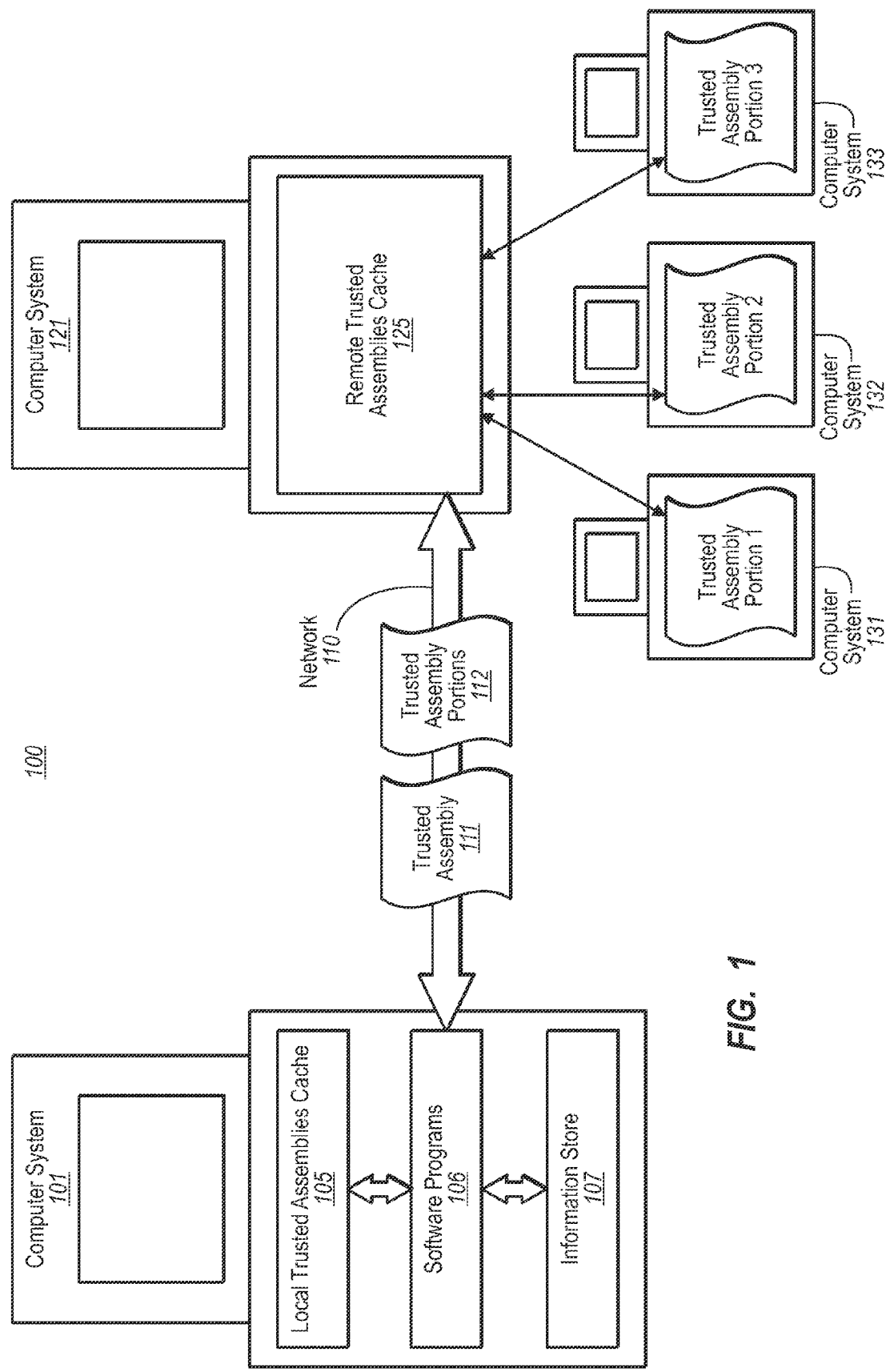
FIG. 1 illustrates a computer architecture in which embodiments of the present invention may operate including accessing a trusted assembly from a virtualized location.

Embodiments of the present invention are directed to accessing a trusted assembly from a virtualized location. In one embodiment, a computer system performs a method for accessing a trusted assembly from a virtualized location. A computer system detects receipt of a request to access an assembly. The address of the assembly is expressed in the request as a virtualized location. The computer system resolves the virtualized location to a physical location where the assembly is physically stored. The resolving includes accessing an information store that maintains the current physical location corresponding to the requested assembly's virtualized location. The computer system determines whether the requested assembly qualifies as a trusted assembly by verifying that the assembly sufficiently complies with information encoded within the assembly. Lastly, upon determining that the requested assembly is trusted, the computer system accesses the requested assembly from the physical location. The embodiments of the present invention may comprise a special purpose or general-purpose computer including various types of computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. Such computer-readable media can be divided into two separate categories: computer-readable storage media, and communication media. Computer-readable storage media comprise physical (or recordable type) computer-readable media including RAM, ROM, EEPROM, CD-ROM or other optical disk storage, magnetic disk storage or other magnetic storage devices, or any other similar storage medium which can be used to store desired program code means in the form of computer-executable instructions or data structures and which can be accessed by a general purpose or special purpose computer. Communication media, on the other hand, comprises signals or carrier waves. For example, when information is transferred or provided over a network or another communications connection (either hardwired, wireless, or a combination of hardwired or wireless) to a computer, the computer properly views the connection as a communication medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

FIG. 1 illustrates a computer architecture 100 in which the principles of the present invention may be employed. Computer architecture 100 includes computer system 101. In some embodiments, computer system 101 may be configured to communicate with computer system 121 via network 110. Computer system 101 includes local trusted assemblies cache 105. An "assembly", as the term is used as herein, is a portion of compiled, executable code. For example, an assembly may be an .exe file, .dll file, or any other executable file. A "trusted assembly" is one that is believed to be safe to execute. For example, a safe file may be a file that is free from malicious code, is located in a known, trusted location, is trusted based on a rule or policy, or can be identified using a digital certificate or some other authentication means that identifies the file to the user. A "trusted assemblies cache", as the term is used herein, is a store or repository for trusted assemblies.

Computer system 101 also includes software programs 106. Software programs 106 may include any type of software program that may be run on a computer system. For example, software programs 106 may include word processing software, accounting software, gaming software, developing software, or any software program that might use a trusted assembly. Oftentimes, trusted assemblies are used to perform menial tasks that are frequently used by programs. For example, software programs 106 may use an executable linking file (such as a .dll file) to draw a menu to a computer screen or print a document. As another example, each software program on computer system 101 may use the same linking file to communicate with the video card so as to display the desired menu on the display device. In some embodiments, such a linking file may be a trusted assembly, and may be stored in local trusted assemblies cache 105.

In some embodiments of the present invention, the requested trusted assembly is not physically located on the computer system. For example, one or more trusted assemblies may be located in remote trusted assemblies cache 125 on computer system 121. Furthermore, in some embodiments, the trusted assembly may be divided into one or more portions. Each portion may be stored on one or more other computer systems. For example, a trusted assembly may be divided into three portions (it should be noted that this number of portions was arbitrarily chosen and that the number of portions could be larger or smaller) where each portion is stored on a separate computer system. In this example as illustrated in computer architecture 100, trusted assembly portion 1 (141) is stored on computer system 131. Trusted assembly portion 2 (142) is stored on computer system 132, and trusted assembly portion 3 (143) is stored on computer system 133. It should be noted that no portions, all three portions, or any combination of assembly portions could be stored on any one or a combination of computer systems 131, 132 and 133.

In some embodiments, computer system 121 is configured to communicate with other computer systems that store portions of trusted assemblies. Thus, when computer system 121 receives a request for a trusted assembly, computer system 121 can communicated with those computers on which the assembly portions are stored and can receive those portions. In some embodiments, the trusted assembly portions (e.g. trusted assembly portions 112) are sent to software programs 106 on computer system 101. In other cases, the entire requested trusted assembly will be located in one physical location (e.g. in remote trusted assemblies cache 125 or on one of computer systems 131, 132 or 133). In such cases, the entire assembly (e.g. trusted assembly 111) can be transmitted across network 110. Thus, as will be explained in greater detail below, software programs 106 may access trusted assemblies stored locally or remotely, depending on the physical location of the trusted assembly.

Figure 2:
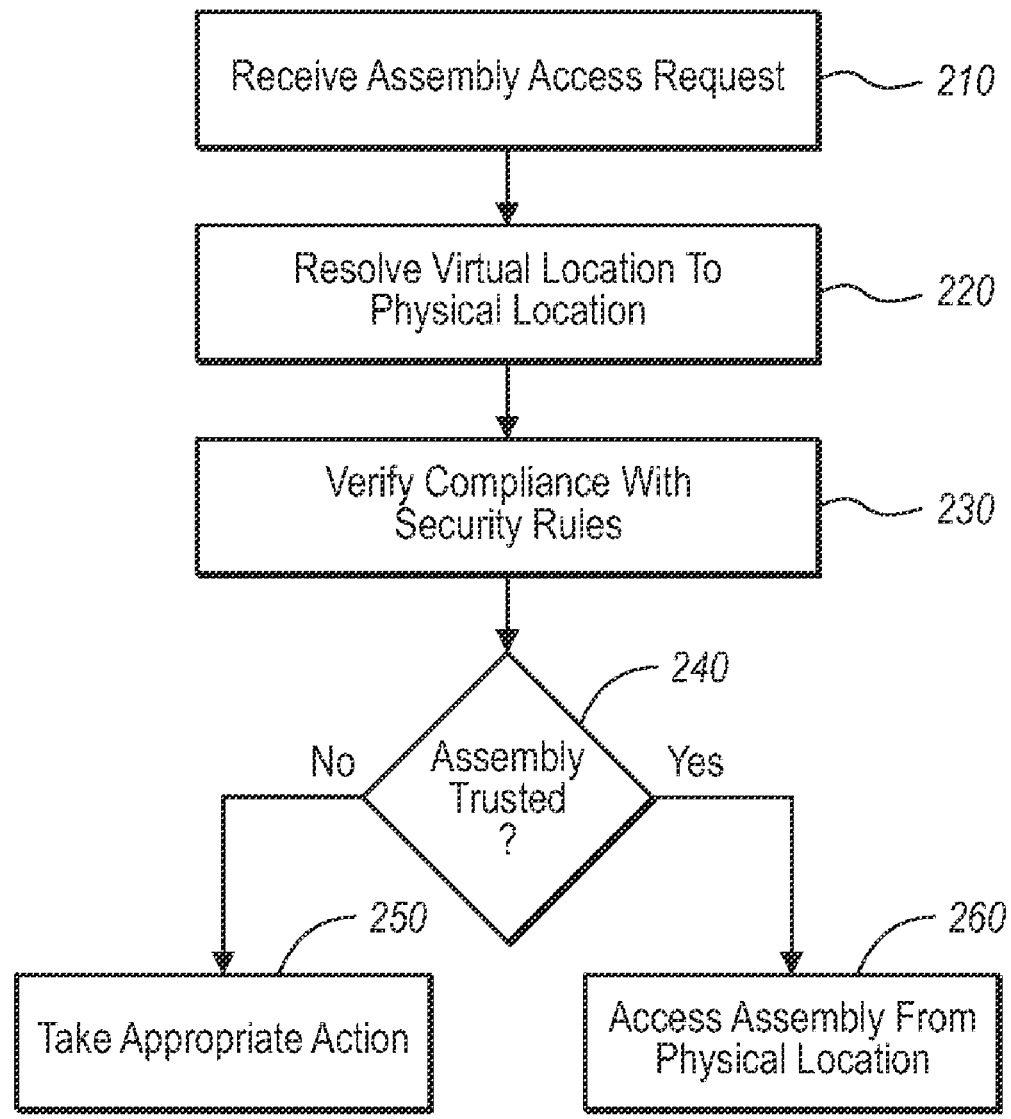
FIG. 2 illustrates a flowchart of an example method for accessing a trusted assembly from a virtualized location.

FIG. 2 illustrates a flowchart of a method 200 for accessing a trusted assembly from a virtualized location. The method 200 will now be described with frequent reference to the components and data of environment 100.

Method 200 includes an act of detecting receipt of a request to access an assembly, wherein the address of the assembly is expressed in the request as a as virtualized location (act 210). For example, computer system 101 may detect receipt of a request to access an assembly (e.g. trusted assembly 111) where the address of the assembly is expressed in the request as a virtualized location. A "virtualized location", as the term is used herein, is information that does not necessarily on its own imply any information regarding the corresponding physical local, but it is information from which a program may derive the actual physical location of an assembly or other object. The location information may be modified by a user or software program to indicate a change in the assembly's name, location, or other characteristic of the assembly.

In some embodiments, the virtualized location corresponds to multiple physical locations. For example, in cases where a trusted assembly has been divided into more than one portion, the trusted assembly may be physically stored on more than one computer system. For example, trusted assembly portion 1 (141) may be stored on computer system 131. Trusted assembly portion 2 (142) may be stored on computer system 132, and trusted assembly portion 3 (143) may be stored on computer system 133. Thus, in such a case, the virtualized location could be used to identify that the corresponding requested trusted assembly is divided into three portions and to identify where each portion is located. In some embodiments, each portion may be stored multiple times in different, geographically dispersed locations. Thus, if one of the computer systems that stored a trusted assembly portion were to fail, the portion would also be stored on a separate computer system in a geographically dispersed location. Storing trusted assemblies in this manner greatly strengthens a system's fault tolerance. In other cases, where the requested trusted assembly is stored without division, the virtualized location could be used to infer the single physical location of the stored assembly. As was the case with divided (or distributed) assemblies, whole assemblies may also be stored in duplicate form on multiple computer systems in geographically dispersed locations so as to increase fault tolerance.

In some embodiments, a string identifier is used to identify the physical location of a requested assembly. A string identifier is electronically stored information integrated into the assembly that identifies characteristics of the assembly. For example, a trusted assembly may have a string identifier that indicates the assembly's name, size, date of last modification, encryption type and any other characteristic that may be used to identify the assembly.

Method 200 also includes an act of resolving the virtualized location to a physical location where the assembly is physically stored, the resolving comprising accessing an information store that maintains sufficient information from which the current physical location(s) of the requested assembly may be derived using the requested assembly's virtualized location (act 220). For example, computer system 101 may resolve the virtualized location to a physical location (e.g., local trusted assemblies cache 105 or remote trusted assemblies cache 125). Resolving may include accessing information store 107 which maintains the current physical location corresponding to the requested assembly's virtualized location. Information store 107 can also be stored at a network location from which the physical location corresponding to the requested assembly's virtualized location is periodically downloaded locally as a performance optimization. In some cases, the physical location is a network location. For instance, the physical location of the trusted assembly may be accessible via network 110 (e.g., computer systems 121, 131, 132 and 133). In other cases, the virtualized location is a local location (e.g., local trusted assemblies cache 105).

In some cases, it may be possible to change the physical location of the assembly while maintaining the same virtualized location. For example, software programs 106 may be configured to reference a certain virtualized location, for example, using a string identifier such as a UUID (Universally Unique Identifier). Over time, the physical location of the assembly may change, for example, from remote trusted assemblies cache 125 to local trusted assemblies cache 105 or to computer system 131, etc., with or without the user's knowledge and without informing software programs 106 of the change. Because the software programs are configured to reference a certain virtualized location which remains the same, the physical location within the virtualized location can change without the user's awareness.

Method 200 includes an act of determining whether the requested assembly qualifies as a trusted assembly by verifying that the assembly sufficiently complies with information encoded within the assembly (act 230). For example, computer system 101 may determine whether the requested assembly qualifies as a trusted assembly by verifying that the assembly sufficiently complies with information encoded within the assembly. In some cases, an assembly may trust all assemblies or portions of assemblies located at a trusted virtualized location. For example, once a particular virtualized location is known to be a trusted location, a software program can then trust any assembly files located in that location (e.g. remote trusted assemblies cache 125).

As mentioned above, in some embodiments, the information encoded within the assembly includes information in the assembly's string identifier. A string identifier may include the assembly's name, type, date of last modification, and any other characteristics. These characteristics may be verified to determine whether the as requested assembly is the one that was expected and can therefore be trusted. In some cases, the information encoded within the assembly includes security metadata. Similar to the string identifier, as explained above, security metadata may include information and/or characteristics of the assembly that can be used to verify that the requested assembly is a trusted assembly. Digital certificates may also be used as the information encoded within the assembly. In such cases, trust is granted based on whether the digital certificate is verified as being authentic. Security metadata can also include a signed verification for the assembly and other security implementations such as AUTHENTI-CODE™ signed assemblies.

Furthermore, information encoded in computer system 101 or computer programs 106 may include rules and/or policies used to resolve the assembly's physical location. In cases where an assembly is trusted based on its physical and/or virtual location, the requested assembly may be trusted because the rules and/or policies were used to determine the location of the assembly. In some embodiments, such rules and policies may be user customizable. That is, a user may customize the rules and/or policies that determine how to resolve an assembly's physical location from its virtual location. In some cases, customizing a customizable rule and/or policy includes selecting the names of assemblies that are to be trusted. Thus, in such cases, a computer system may know that an assembly is trusted because the processed rule has indicated that the name of the assembly is a trusted name. In still other cases, customizing a customizable rule may include selecting the number of assemblies that are to be trusted.

Method 200 includes, upon determining that the requested assembly is trusted (YES in decision box 240), an act of accessing the requested assembly from the physical location (act 260). For example, computer system 101 may, upon determining that the requested assembly is trusted, access the requested assembly from the physical location (e.g., remote trusted assemblies cache 125). In some cases, the requested assembly will have been updated since its last use. In some embodiments, computer system 101 automatically requests file updates. Such a request for updates may be transparent to the user. In this manner, the user continually receives the latest version of the assembly without having to actively search for it. If the assembly is not trusted (NO in decision box 240), appropriate action may be taken (act 250), such as halting the program until a trusted assembly can be found. Or, alternatively, the assembly could still be loaded and executed, but at a reduced level of trust. Thus, in some embodiments, computer architecture 100 may additionally be used as a general mechanism for loading arbitrary, but untrusted, code from a virtualized location.

In an alternative embodiment, a computer system (e.g. computer system 101) performs a method for accessing a trusted program file from an addressable location. The method includes an act of receiving a communication, wherein the communication includes a request to access a program file. The address of the program file is expressed in the request as a first addressable location. The method includes an act of resolving the first addressable location to a second addressable location, where the program file is physically stored at the second addressable location and the resolving includes accessing an information store that maintains the current physical location of a program file corresponding to the requested program file's first addressable location. The method includes an act of determining whether the requested program file qualifies as a trusted program file by verifying that the program file at least sufficiently complies with information encoded within the program file. Lastly, if it is determined that the requested program file is trusted, the method includes an act of accessing the requested program file from the second location.

Figure 3:
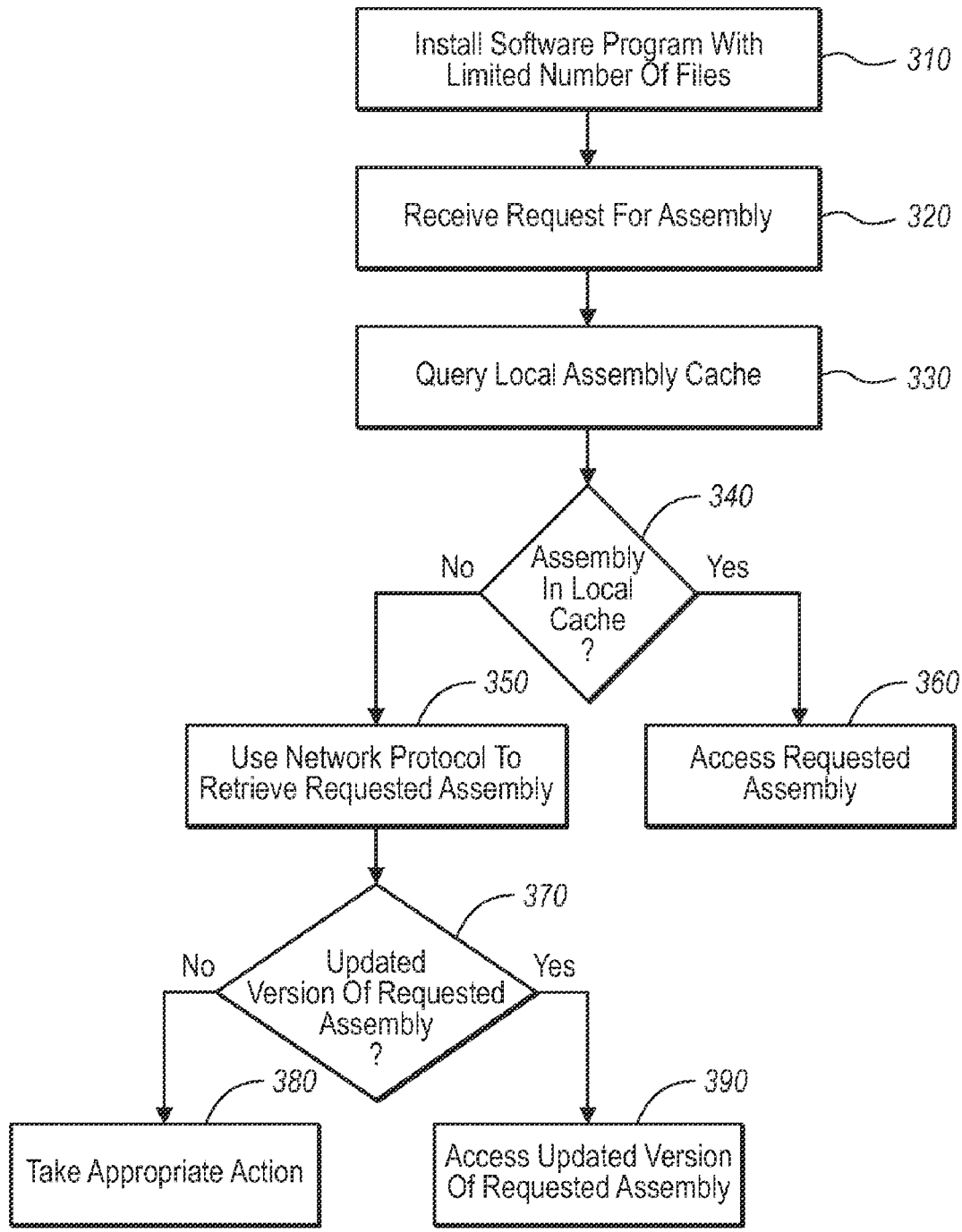
FIG. 3 illustrates a flowchart of an alternative example method for accessing a trusted assembly from a virtualized location.

FIG. 3 illustrates a flowchart of a method 300 for accessing a trusted assembly from a virtualized location. The method 300 will now be described with frequent reference to the components and data of environment 100.

Method 300 includes an act of installing a software program, wherein the act of installing the software program results in an installation of a subset, but not all, of files helpful to implement one or more portions of the software program's functionality (act 310). For example, software programs 106 may be installed, where the installation results in an installation of a subset, but not all, of files helpful to implement one or more portions of the software programs' functionality. For instance, in cases where a large application is to be installed, it may be advantageous to initially install only those files that are necessary or helpful to run the program. Later, as time goes by and the user begins to use different, uninstalled portions of the program, the program may be configured to install additional files, as will be explained in greater detail below.

Method 300 includes an act of receiving from the software program a request for an assembly (act 320). For example, computer system 101 may receive a request for an assembly from one of software programs 106. In some cases, multiple software programs may simultaneously send requests to use one or more assemblies. The requests may be for the same assembly or for different assemblies Method 300 includes an act of querying a local assembly cache for the requested assembly (act 330). For example, computer system 101 may query local trusted assembly cache 105 for the requested assembly. As explained above, local trusted assembly cache 105 may be a repository for trusted assemblies, stored on as computer system 101.

Method 300 includes, upon determining that the requested assembly is not stored in the local assembly cache, an act of using a network protocol to retrieve the requested assembly from a virtualized location (act 350). For example, computer system 101 may determine that the requested assembly is not stored in local trusted assembly cache (NO in decision box 340) and use a network protocol to retrieve the requested assembly from a virtualized location. As explained above, the virtualized location may include information indicating the physical location of the requested assembly. Computer system 101 may retrieve the requested assembly from the physical location indicated by the virtualized location using a network protocol on network 110. If computer system 101 determines that the requested assembly is stored in local trusted assemblies cache 105 (YES in decision box 340), computer system 101 can access the requested assembly from the local cache 105 (act 360). Additionally or alternatively, at decision point 340, there could be a subsequent check for an updated version of the requested assembly, as is shown in the diagram at 370. For example, if a local version of the trusted assembly exists in local trusted assemblies cache 105, computer system 101 may nonetheless decide to check and see if there is a newer version of that assembly available.

Method 300 includes an act of using the network protocol to determine whether an updated version of the requested assembly exists (decision box 370). For example, Hypertext Transfer Protocol (HTTP) may be used to determine whether an updated version of the requested assembly exists. HTTP has built-in properties that allow it to automatically query the computer system with which it is communicating to discover whether updated files exist. If no updated version of the requested assembly exists (NO in decision box 370), appropriate action may be taken (act 380), such as retrieving the current version of the requested assembly. If an updated version of the requested assembly does exist (YES in decision box 370), the updated version of the requested assembly may be accessed by the network protocol (e.g., HTTP) (act 390) and sent via network 110 to computer system 101. In some embodiments, once an updated version of the requested assembly (that was not initially in the local cache) may be cached in local trusted assemblies cache 105 so that the next time one of software programs 106 needs this particular assembly, the assembly will be available in local cache 105, thus saving time in retrieving the assembly. Other network protocols may be used in place of or in addition to HTTP in the example above. For instance, Distributed File System (DFS) may be used to determine whether an updated version of the requested assembly exists. DFS may also be beneficial for fault tolerance and load balancing of virtualized assemblies.

Thus, embodiments of the present invention describe accessing a trusted assembly from a virtualized location A computer system can resolve a request to access an assembly using a virtualized location. The computer system determines whether the requested assembly qualifies as a trusted assembly, and if trusted, the computer system accesses the requested assembly from the physical location.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable storage media, not including signals, having stored thereon computer-executable instructions that, when executed by one or more processors of a computer system, cause the computer system to perform a method for accessing a trusted assembly from a virtualized location, the method comprising:

an act of detecting receipt of a request from the computer system to access an assembly comprising a library that is shared by a plurality of software programs, wherein the address of the assembly is expressed in the request as a virtualized location, the assembly being stored on a separate computer system in a trusted assembly cache;

an act of resolving the virtualized location to a physical location where the assembly is physically stored on the separate computer system, the resolving comprising accessing an information store that maintains the current physical location corresponding to the requested assembly's virtualized location;

an act of determining whether the requested assembly qualifies as a trusted assembly by verifying that the assembly sufficiently complies with information encoded within the assembly; and upon determining that the requested assembly is trusted, an act of accessing the requested assembly from the physical location.

2. The computer program product of claim 1, wherein the trusted assembly cache is stored on a plurality of computer systems.

3. The computer program product of claim 2, wherein the method further comprises an act of dividing the requested assembly into one or more portions and storing each portion on at least one of the plurality of computer systems.

4. The computer program product of claim 3, wherein the plurality of computer systems is geographically dispersed so as to increase fault tolerance.

5. The computer program product of claim 1, wherein a string identifier is used to identify the physical location of the requested assembly.

6. The computer program product of claim 1, wherein the method further comprises trusting all assemblies or portions of assemblies located at a trusted virtualized location.

7. The computer program product of claim 1, wherein the information encoded within the assembly comprises information in the assembly's string identifier.

8. The computer program product of claim 1, wherein the information encoded within the assembly comprises security metadata.

9. The computer program product of claim 1, wherein the information encoded within the assembly comprises rules and/or policies that are used to resolve the assembly's physical location.

10. The computer program product of claim 9, wherein the rules and policies are user customizable.

11. The computer program product of claim 10, wherein customizing a customizable rule includes selecting the names of trusted assemblies.

12. The computer program product of claim 10, wherein customizing a customizable rule includes selecting the number of assemblies that are to be trusted.

13. The computer program product of claim 1, wherein the information encoded within the assembly comprises a digital certificate.

14. The computer program product of claim 1, wherein the physical location is a network location.

15. The computer program product of claim 1, wherein the method further comprises changing the physical location of the assembly while maintaining the same virtualized location.

16. The computer program product of claim 1, wherein the method further comprises automatically requesting file updates transparent to the user.

17. A computer program product comprising one or more computer-readable storage media, not including signals, having stored thereon computer-executable instructions that, when executed by one or more processors of a computer system, cause the computer system to perform a method for accessing trusted assemblies from a virtualized location, the method comprising:

an act of installing a software program, wherein the act of installing the software program results in an installation of a subset, but not all, of files helpful to implement one or more portions of the software program's functionality;

an act of receiving from the software program a request for an assembly comprising a library that is shared by a plurality of software programs;

an act of querying a local assembly cache for the requested assembly;

upon determining that the requested assembly is not stored in the local assembly cache, an act of using a network protocol to retrieve the requested assembly from a virtualized location, the virtual location representing a location in an assembly cache on a separate computer system;

an act of using the network protocol to determine whether an updated version of the requested assembly exists; and upon determining that an updated version of the requested assembly exists, an act of accessing the updated version of the requested assembly.

18. The computer program product of claim 17, wherein the method further comprises locally caching the retrieved assembly.

19. The computer program product of claim 17, wherein the protocol is HTTP.

20. A method for accessing a trusted program file from an addressable location, the method comprising:

an act of receiving a communication at a first computer system, wherein the communication includes a request to access a program file, the address of the program file being expressed in the request as a first addressable location, the program file comprising a library that is shared by a plurality of software programs;

an act of resolving the first addressable location to a second addressable location, wherein the program file is physically stored at the second addressable location in an assembly cache, the second addressable location being a second computer system separate from the first computer system, the resolving comprising accessing an information store that maintains the current physical location of a program file corresponding to the requested program file's first addressable location;

an act of determining whether the requested program file qualifies as a trusted program file by verifying that the program file at least sufficiently complies with information encoded within the program file; and if it is determined that the requested program file is trusted, an act of accessing the requested program file from the second location.

* * * * *